(12) United States Patent
Johgan et al.

(10) Patent No.: US 7,102,708 B2
(45) Date of Patent: Sep. 5, 2006

(54) COLOR FILTER SUBSTRATE WITH PLURALITY OF SPACERS HAVING PREDETERMINED RELATIVE POSITIONS FOR SELECTED ONES OF COLOR FILTERS AND DISPLAY DEVICE

(75) Inventors: Shingo Johgan, Soraku-gun (JP); Ichiroh Shiraki, Tenri (JP); Keisuke Yoshida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/629,873

(22) Filed: Jul. 30, 2003

(65) Prior Publication Data

US 2004/0021808 A1    Feb. 5, 2004

(30) Foreign Application Priority Data

Jul. 30, 2002    (JP) ............................ 2002-220787

(51) Int. Cl.
  *G02F 1/1335*    (2006.01)
  *G02F 1/1339*    (2006.01)
(52) U.S. Cl. ...................... 349/106; 349/155; 349/156
(58) Field of Classification Search ............... 349/106, 349/155, 156
  See application file for complete search history.

(56) References Cited

U.S. PATENT DOCUMENTS

| 6,184,959 B1* | 2/2001 | Izumi .................. 349/124 |
| 6,317,188 B1* | 11/2001 | Shibahara ............ 349/155 |
| 2002/0060771 A1* | 5/2002 | Sumino et al. ....... 349/156 |

FOREIGN PATENT DOCUMENTS

JP    2001-021900    1/2001

* cited by examiner

*Primary Examiner*—Tarifur R. Chowdhury
(74) *Attorney, Agent, or Firm*—Nixon & Vanderhye P.C.

(57) ABSTRACT

A color filter substrate includes a base member, a color filter layer, and spacers. The color filter layer is provided on the base member and made up of first, second and third groups of color filters, which transmit light rays representing three different colors, respectively. The spacers are provided at predetermined relative positions for selected ones of the color filters. The selected color filters consist of color filters belonging to the first group, color filters belonging to the second group, and color filters belonging to the third group. The spacers are arranged such that in the selected color filters, the smallest number of color filters of the first, second or third group is at least 80% of the largest number of color filters of the first, second or third group.

9 Claims, 8 Drawing Sheets

COLOR FILTER SUBSTRATE WITH PLURALITY OF SPACERS HAVING PREDETERMINED RELATIVE POSITIONS FOR SELECTED ONES OF COLOR FILTERS AND DISPLAY DEVICE

BACKGROUND OF THE INVENTION

1. Field of the Invention

The present invention relates to a color filter substrate and a display device. More particularly, the present invention relates to a special positional relationship between color filters and spacers that can be used effectively in a high-definition display device and a color filter substrate.

2. Description of the Related Art

A color liquid crystal display (LCD) currently used extensively is provided with color filters for respective picture elements (also called "dots). Typically, three groups of color filters to transmit light rays representing the three primary colors of red (R), green (G) and blue (B), respectively (which will be referred to herein as "R, G and B color filters") are arranged in a predetermined pattern for those picture elements. One pixel is made up of three picture elements (dots) provided with the R, G and B color filters (which will be referred to herein as "R, G and B picture elements", respectively), and can contribute to presenting an image in full colors.

In this manner, each set of color filters (or picture elements) typically transmits R, G and B light rays. However, the colors of the color filters may also consist of cyan (C), magenta (M) and yellow (Y) or any other arbitrary combination of three colors. Also, exemplary color filter arrangements include a striped arrangement, a delta arrangement and a mosaic arrangement.

In a normal LCD, a liquid crystal layer is provided between two substrates, and a color filter layer, in which those color filters are arranged for respective picture elements, is provided on one of the two substrates. For example, in a TFT LCD, a liquid crystal layer is often provided between a TFT substrate, including circuit components such as picture element electrodes and TFTs thereon, and a counter substrate, including a counter electrode and the color filter layer thereon. The color filter layer is sometimes provided on the TFT substrate in some known arrangements. However, the majority of LCDs currently on the market includes the color filter layer on their counter substrate. The counter substrate with the color filter layer is often called a "color filter substrate".

In a normal LCD, spacers are provided to control the thickness of the liquid crystal layer (which is also called a "cell gap") in the process step of bonding and fixing the color filter substrate and TFT substrate together. However, as the display quality of LCDs has been further improved, the inevitable decrease in the display quality due to the presence of those spacers has become more and more significant.

In a conventional TFT LCD, bead-like or rod-like spacers with a predetermined diameter are dispersed on the surface of the color filter substrate or TFT substrate. For that reason, it is difficult to distribute the spacers at sufficiently uniform densities over the entire display screen, thus possibly making the cell gap non-uniform or causing some display defects due to the agglomeration of the spacers. Also, if the spacers are provided inside of picture elements, then the substantial aperture ratio may decrease or some bright spots may be observed.

To overcome these problems, a method of selectively arranging the spacers in a predetermined region outside of the picture elements (typically in a region that is covered with a black matrix) was developed. For example, a method of providing columnar spacers in a predetermined region by performing a photolithographic process using a photosensitive resin (which is often called a "photoresist") is used in actual manufacturing processes. In the following description, spacers that are provided at predetermined positions selectively will be referred to herein as "columnar spacers". But the "columnar" spacers do not have to be exactly columnar but may also be in a wall shape, for example.

However, the present inventors discovered via experiments that the following problems arise when those columnar spacers are used. The problems of the prior art will be described on a conventional TFT LCD as an example.

FIG. 7 is a plan view showing an exemplary arrangement of columnar spacers 2 in a conventional TFT LCD 70. The arrangement shown in FIG. 7 is an arbitrary portion of a display panel. In the accompanying drawings, the location of a picture element 1 will be identified by, the number of a row that is associated with one of the gate lines G1, G2, G3 and so on, and the number of a column that is associated with one of the source lines S1, S2, S3 and so on. Also, in FIGS. 1 through 8, R, G and B represent the colors of color filters that are provided for respective picture elements 1 and the solid circles represent the columnar spacers 2.

Also, when the positional relationship between the picture elements 1 and the columnar spacers 2 is described, each of the columnar spacers 2 will be regarded herein as being associated with (or belonging to) its upper left picture element 1. However, each of those columnar spacers 2 may also be associated with its lower right picture element 1, for example, as long as the same association rule applies to each and every pair of columnar spacer 2 and picture element 1.

If one columnar spacer 2 is provided for each picture element 1 as shown in FIG. 7, then the density of the columnar spacers 2 (i.e., the number of columnar spacers per unit area) will be so high as to apply a shear stress horizontally to the gap between the TFT substrate and the counter substrate. In that case, once one of the TFT and counter substrates has shifted with respect to the other, then the two substrates may not be brought back to their original positions unless some impact is applied. Also, once the relative positions of the two substrates have deviated, deterioration in display quality (e.g., decrease in aperture ratio) will be caused.

On the other hand, as disclosed in Japanese Laid-Open Publication No. 2001-21900, an LCD, in which the columnar spacers are provided for picture elements in a particular color only, is also known. However, if the columnar spacers 2 are provided for only the picture elements 1 in a particular color (e.g., R) as in the LCD 80 shown in FIG. 8, then the density of the columnar spacers 2 will be too low to make the assembly resistible to a high compacting pressure in the process step of bonding the TFT and counter substrates together. As a result, the cell gap may also become non-uniform.

Furthermore, if the width of the black matrix (i.e., the width of the gaps between adjacent picture elements) is minimized to maximize the aperture ratio in a high-definition LCD, then even slight misalignment will affect the display quality seriously. That is to say, once the orientation directions of liquid crystal molecules are disturbed by the columnar spacers on the black matrix, the liquid crystal molecules are also misaligned inside of the picture elements, thus deteriorating the display quality significantly. In the arrangement shown in FIG. 8 in which the columnar spacers 2 are provided for only the picture elements 1 in a particular color, if any misalignment has occurred in the process step of bonding the TFT and counter substrates together, only the picture elements in the particular color will be seriously affected by the disturbance in orientation directions due to the presence of the columnar spacers. As a result, the display quality locally decreases significantly. For example, if the columnar spacers 2 have shifted upper-leftward, then the display quality of the R picture elements will decrease significantly. On the other hand, if the columnar spacers 2 have shifted upper-rightward, then the display quality of the G picture elements will decrease significantly. Accordingly, when the columnar spacers are arranged as shown in FIG. 8, not only decrease in contrast ratio due to the drop of the aperture ratio but also loss of the color balance are brought about.

The problems of the prior art have been described on the striped arrangements shown in FIGS. 7 and 8. However, similar problems also arise in delta arrangements or mosaic arrangements, i.e., no matter how the color filters are arranged.

SUMMARY OF THE INVENTION

In order to overcome the problems described above, preferred embodiments of the present invention provide a display device which can present an image at a high resolution and with an excellent color balance maintained, and also provide a color filter substrate which can be used effectively in such a display device.

A color filter substrate according to a preferred embodiment of the present invention preferably includes a base member, a color filter layer, and a plurality of spacers. The color filter layer is preferably provided on the base member and is preferably made up of a first group of color filters, a second group of color filters and a third group of color filters. The first, second and third groups of color filters preferably transmit light rays representing three different colors, respectively. The spacers are preferably provided at predetermined relative positions for selected ones of the color filters. The selected color filters preferably consist of a number of color filters belonging to the first group, a number of color filters belonging to the second group, and a number of color filters belonging to the third group. The spacers are preferably arranged such that in the selected color filters, the smallest number of color filters of the first, second or third group is at least 80% of the largest number of color filters of the first, second or third group.

In one preferred embodiment of the present invention, the color filter substrate is preferably used in a display device, and the spacers preferably are arranged in at least 80% of a display area of the display device when attached to the display device.

In another preferred embodiment, the spacers are preferably provided in gaps between the color filters.

In still another preferred embodiment, the spacers are preferably columnar spacers. More particularly, the spacers preferably have a substantially circular or substantially square cross section that is parallel to the surface of the base member.

In yet another preferred embodiment, the color filters are preferably arranged at a predetermined pitch px in a row direction and at another predetermined pitch py in a column direction, respectively. The spacers preferably include a set of five spacers consisting of a first pair of spacers, a second pair of spacers, and a central spacer. The spacers of the first pair are preferably separated from each other by a distance of m·px (where m is an integer equal to or greater than 2 but is not a multiple of 3) in the row direction. The spacers of the second pair are preferably separated from the spacers of the first pair by a distance of n·py (where n is a positive integer and a multiple of 2) in the column direction. The central spacer is preferably separated from the spacers of the first pair by a distance of m·px/2 in the row direction and by a distance of n·py/2 in the column direction, respectively.

In this particular preferred embodiment, the first pair of spacers and the central spacer consist of a first spacer, a second spacer and a third spacer associated with the first, the second and the third groups of color filters, respectively, the second pair of spacers and the central spacer consist of another first spacer, another second spacer and another third spacer associated with the first, the second and the third groups of color filters, respectively.

More specifically, the spacers of the first pair are preferably adjacent to each other in the row direction, the spacers of the second pair are also preferably adjacent to each other in the row direction, and the spacers of the first and second pairs preferably include spacers that are adjacent to each other in the column direction.

In yet another preferred embodiment, the color filters preferably include multiple sets of color filters. Each set of color filters preferably consists of three color filters belonging to the first, second and third groups, respectively. The selected color filters, for which the spacers are provided, preferably belong to mutually different sets of color filters.

In this particular preferred embodiment, the different sets of color filters, to which the color filters provided with the spacers belong, are preferably not adjacent to each other.

In yet another preferred embodiment, the spacers are preferably arranged at a density of 800 spacers/cm$^2$ to 1,200 spacers/cm$^2$ with respect to the color filter layer.

A display device according to a preferred embodiment of the present invention preferably includes two substrates, a display medium layer, a plurality of picture elements, and a plurality of spacers. The display medium layer is preferably provided between the two substrates. Each of the picture elements preferably includes an associated portion of the display medium layer. The picture elements are preferably made up of a first group of picture elements, a second group of picture elements and a third group of picture elements. The first, second and third groups of picture elements preferably transmit light rays representing three different colors, respectively. The spacers are preferably provided at predetermined relative positions for selected ones of the picture elements. The selected picture elements preferably consist of a number of picture elements belonging to the first group, a number of picture elements belonging to the second group, and a number of picture elements belonging to the third group. The spacers are preferably arranged such that in the selected picture elements, the smallest number of picture elements of the first, second or third group is at least 80% of the largest number of picture elements of the first, second or third group.

In one preferred embodiment of the present invention, the spacers preferably are arranged in at least 80% of a display area of the display device.

In another preferred embodiment, the spacers are preferably provided in gaps between the picture elements.

In still another preferred embodiment, the spacers are preferably columnar spacers. More particularly, the spacers preferably have a substantially circular or substantially square cross section that is parallel to the surface of the base member.

In yet another preferred embodiment, the picture elements are preferably arranged at a predetermined pitch px in a row direction and at another predetermined pitch py in a column direction, respectively. The spacers preferably include a set of five spacers consisting of a first pair of spacers, a second pair of spacers, and a central spacer. The spacers of the first pair are preferably separated from each other by a distance of m·px (where m is an integer equal to or greater than 2 but is not a multiple of 3) in the row direction. The spacers of the second pair are preferably separated from the spacers of the first pair by a distance of n·py (where n is a positive integer and a multiple of 2) in the column direction. The central spacer is preferably separated from the spacers of the first pair by a distance of m·px/2 in the row direction and by a distance of n·py/2 in the column direction, respectively.

In this particular preferred embodiment, the first pair of spacers and the central spacer consist of a first spacer, a second spacer and a third spacer associated with the first, the second and the third groups of picture elements, respectively, the second pair of spacers and the central spacer consist of another first spacer, another second spacer and another third spacer associated with the first, the second and the third groups of picture elements, respectively.

More specifically, the spacers of the first pair are preferably adjacent to each other in the row direction, the spacers of the second pair are also preferably adjacent to each other in the-row direction, and the spacers of the first and second pairs preferably include spacers that are adjacent to each other in the column direction.

In still another preferred embodiment, the picture elements preferably include multiple pixels, each consisting of three picture elements belonging to the first, second and third groups, respectively. The selected picture elements, for which the spacers are provided, preferably belong to mutually different pixels.

In this particular preferred embodiment, the different pixels, to which the picture elements provided with the spacers belong, are preferably not adjacent to each other.

In yet another preferred embodiment, the spacers are preferably arranged at a density of 800 spacers/cm² to 1,200 spacers/cm² in the display area.

In yet another preferred embodiment, one of the two substrates is preferably a color filter substrate including a plurality of color filters that are provided for the multiple picture elements, while the other substrate is preferably an active-matrix substrate including a plurality of picture element electrodes and a plurality of active elements that are provided for the multiple picture elements. In this case, the spacers may be included in the color filter substrate.

In an alternative preferred embodiment, one of the two substrates is preferably a color filter substrate including a plurality of color filters that are provided for the multiple picture elements, while the other substrate is preferably an active-matrix substrate including a plurality of picture element electrodes and a plurality of active elements that are provided for the multiple picture elements. In this case, the spacers may be included in the active-matrix substrate.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 7:
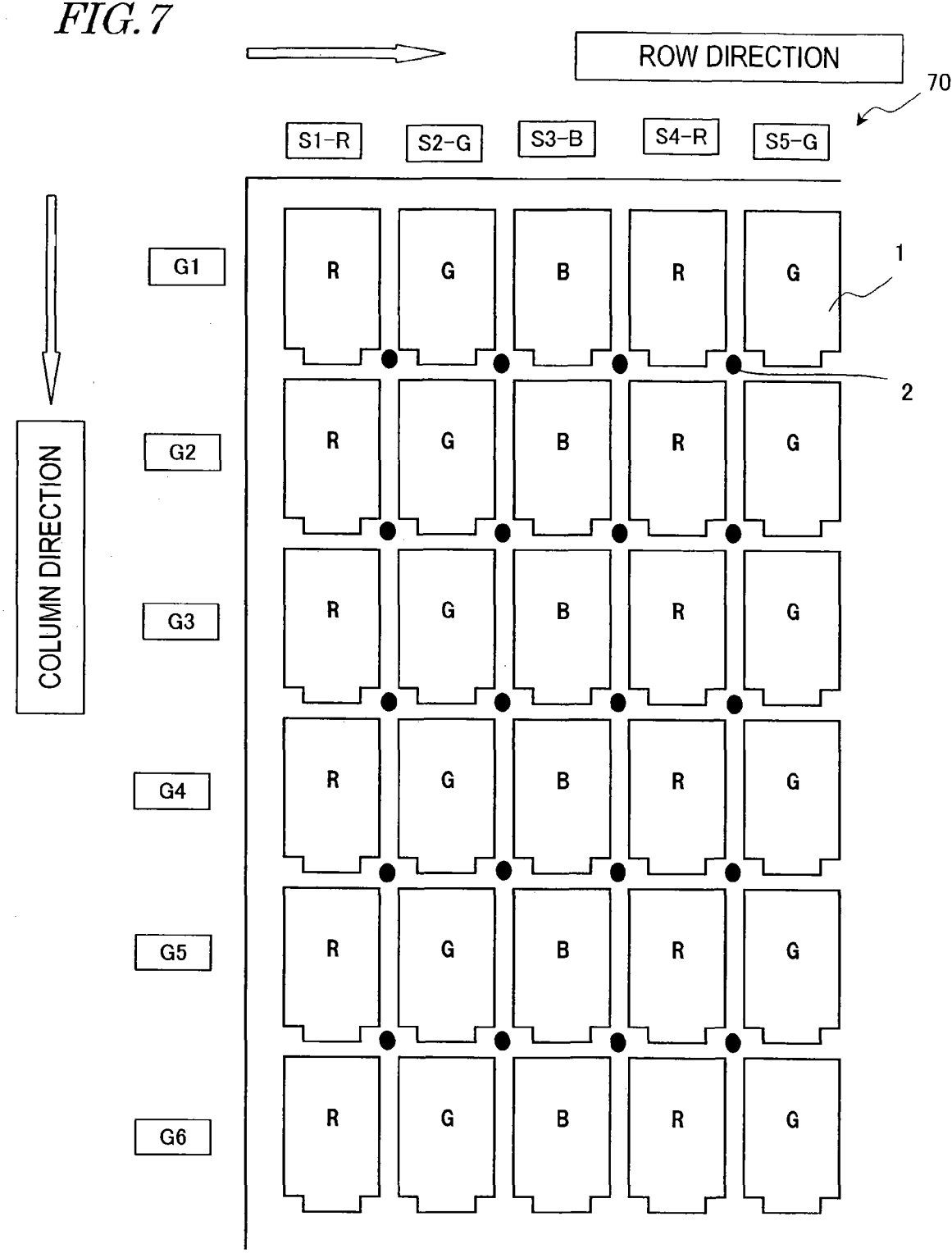
FIG. 7 is a plan view showing an arrangement of columnar spacers 2 in a conventional TFT LCD 70.
Figure 8:
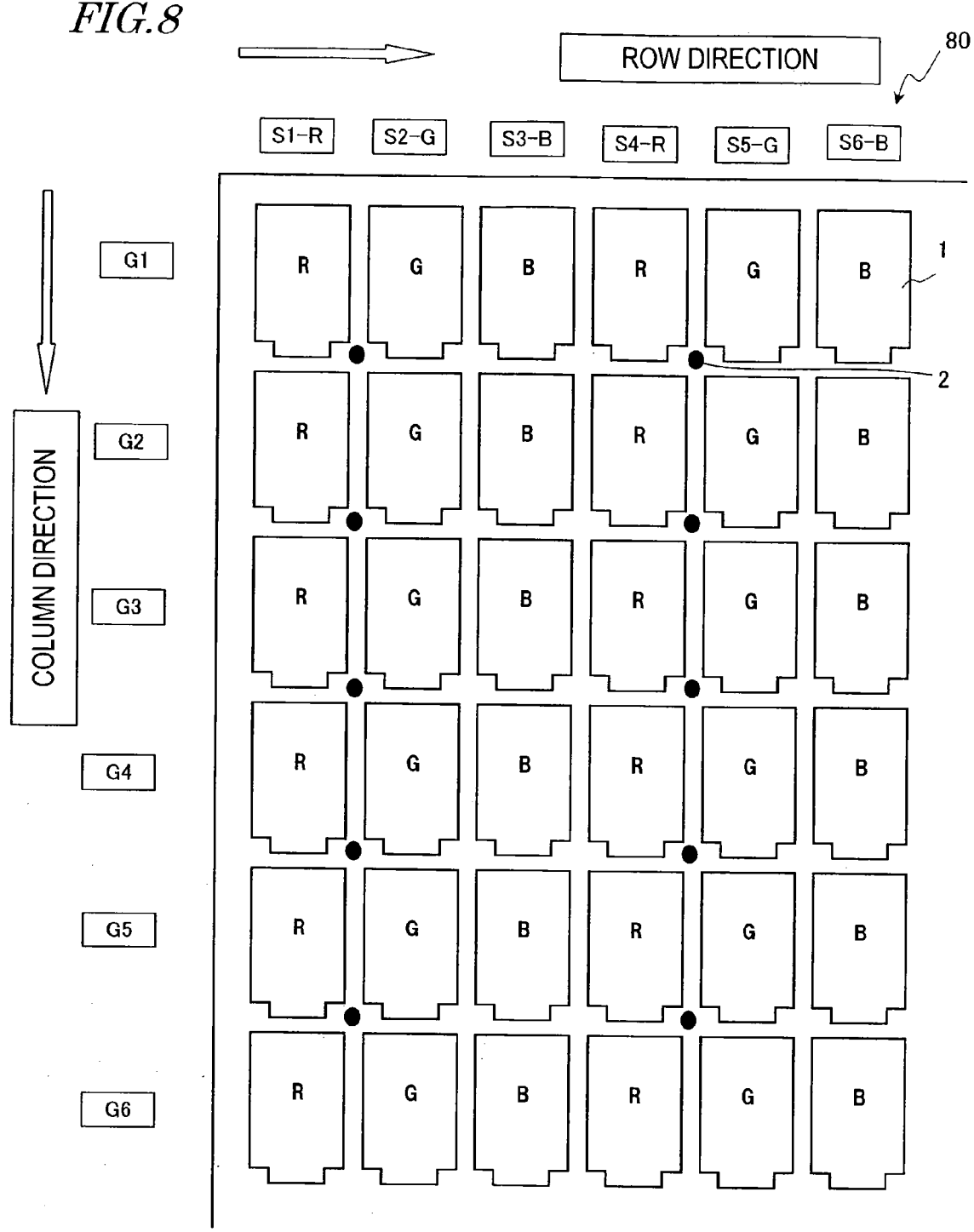
FIG. 8 is a plan view showing an arrangement of columnar spacers 2 in another conventional TFT LCD 80.

Hereinafter, exemplary arrangements of columnar spacers in a display device and a color filter substrate according to various preferred embodiments of the present invention will be described with reference to FIGS. 1 through 6. As in the background section, preferred embodiments of the present invention will be described as being applied to a TFT LCD. However, the present invention is in no way limited to the following specific preferred embodiments. Also, in FIGS. 1 through 6, each component having substantially the same function as the counterpart of the conventional arrangement shown in FIG. 7 or 8 will be identified by the same reference numeral and the description thereof will be omitted herein. FIGS. 1 through 6 are plan views schematically showing arrangements for TFT LCDs according to various preferred embodiments of the present invention. The arrangement shown in each of these drawings is an arbitrary portion of a display panel.

Figure 1:
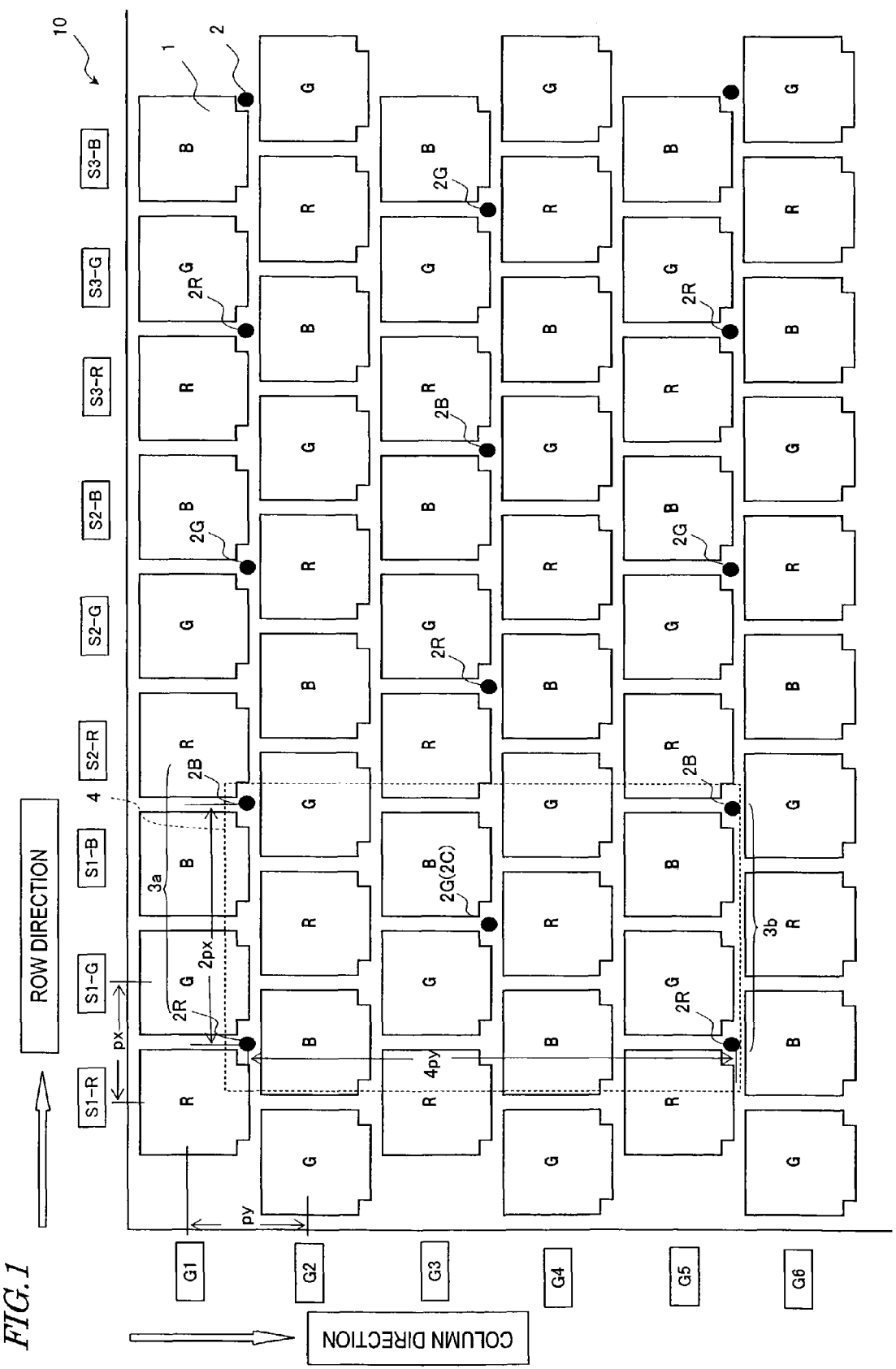
FIG. 1 is a plan view showing an exemplary arrangement of columnar spacers 2 in an LCD 10 according to a preferred embodiment of the present invention.

In the LCD 10 shown in FIG. 1, the picture elements 1 are arranged in a delta arrangement pattern and the columnar spacers 2 are arranged in non-picture element regions that are shielded from light by a black matrix (not shown). In this preferred embodiment, the columnar spacers 2 are not provided for all picture elements 1 but for some selected picture elements 1.

The present inventors discovered via experiments that the columnar spacers 2 preferably have a density of 800 spacers/cm² to 1,200 spacers/cm² in the display area. The reason is as follows. Specifically, if the columnar spacers 2 have a density of less than 800 spacers/cm², then the cell gap sometimes cannot be kept uniform. However, if the density of the columnar spacers 2 exceeds 1,200 spacers/cm², then the horizontal shift of the substrates described above may be irreparable. The same preferred density range of the columnar spacers 2 applies to all of the preferred embodiments shown in FIGS. 1 through 6.

To define the density of the columnar spacers 2 within this preferred range, one columnar spacer 2 may be provided for two picture elements in a 7-inch VGA, for six picture elements in an 8.4-inch VGA and for twelve picture elements in a 13-inch VGA, respectively. The positional relationship between the columnar spacers 2 and the picture elements 1 may be defined according to the resolution of the given LCD (i.e., the number of pixels per unit area as represented by XGA or SXGA, for example).

In the LCD 10 shown in FIG. 1, looking at the $1^{st}$ row associated with the first gate line G1, the leftmost columnar spacer 2R is provided between the R picture element 1 associated with the leftmost source line S1-R and the G picture element 1 associated with the next source line S1-G, the second leftmost columnar spacer 2B is provided between the next B and R picture elements 1, and the third leftmost columnar spacer 2G is provided between the next G and B picture elements 1. That is to say, on the first row associated with the first gate line G1, one columnar spacer 2 is provided for every second picture element 1.

Next, on the $2^{nd}$ row associated with the second gate line G2, no columnar spacers 2 are arranged at all.

Next, on the $3^{rd}$ row associated with the third gate line G3, no columnar spacer is provided between the R picture element 1 associated with the source line S1-R and the G picture element 1 associated with the source line S1-G, but columnar spacers 2G, 2R and 2B are provided between the G picture element 1 associated with the source line S1-G and the B picture element 1 associated with the source line S1-B, between the next R and G picture elements 1, and between the next B and R picture elements 1, respectively.

Next, on the $4^{th}$ row associated with the fourth gate line G4, no columnar spacers 2 are arranged at all.

Next, on the $5^{th}$ row associated with the fifth gate line G5, the columnar spacers 2R, 2B, 2G and so on are provided as on the $1^{st}$ row associated with the first gate line G1. On the $6^{th}$ row associated with the sixth gate line G6, no columnar spacers 2 are provided at all as on the $2^{nd}$ row associated with the second gate line G2. And on the $7^{th}$ row associated with the seventh gate line G7 (not shown), the columnar spacers 2R, 2B, 2G and so on are provided as on the $3^{rd}$ row associated with the third gate line G3.

As shown in FIG. 1, the columnar spacer 2 provided between R and B picture elements is labeled as 2R, the columnar spacer 2 provided between B and R picture elements is labeled as 2B, the columnar spacer 2 provided between G and B picture elements is labeled as 2B. In this manner, on each of the rows including the columnar spacers 2, the columnar spacers 2R, 2B and 2G are arranged in this order. In a normal LCD, each row includes R, G and B picture elements in the same numbers, and therefore, includes the columnar spacers 2R, 2G and 2B in the same numbers, too. Depending on the number of rows with the columnar spacers 2 (i.e., the total number of rows that make up the display area if the columnar spacers 2 are arranged over the entire display area following the arrangement rule described above), the columnar spacers 2R, 2G and 2B sometimes may not be provided in the same numbers. However, if the columnar spacers 2R, 2G and 2B are arranged such that the smallest number of color filters associated with the columnar spacers 2R, 2G or 2B is at least 80% (preferably 90% or more) of the largest number of color filters associated with the columnar spacers 2R, 2G or 2B, then color unevenness is not perceivable so easily even when the substrates shift from each other.

Naturally, the columnar spacers 2 are preferably arranged in the pattern described above in as great a percentage of the display area as possible. However, the effects of the present invention are achievable if the columnar spacers 2 are arranged in the above-described pattern in at least 80% of the overall display area. In any case, the columnar spacers 2 are preferably provided in the gaps between the picture elements 1, i.e., in the regions shielded from light by the black matrix as described above.

More particularly, the columnar spacers 2 preferably have a substantially circular or substantially square cross section that is parallel to the surface of the substrate (i.e., display screen). If the columnar spacers 2 have such a highly symmetrical cross-sectional shape, then color unevenness is much less easily perceivable even in case of misalignment. This is because even when the columnar spacers 2 enter the picture elements 1 due to the misalignment, the picture elements 1 will be affected to almost the same degree no matter in which direction the misalignment has happened.

The columnar spacer arrangement shown in FIG. 1 is also characterized in that the color of a picture element 1 associated with a columnar spacer 2 is different from that of a picture element 1 associated with its adjacent columnar spacer 2. More specifically, two columnar spacers 2, adjacent to each other in the row direction, are associated with two picture elements 1 in two different colors. Also, in the column direction, the columnar spacer 2R or 2B is adjacent to the columnar spacer 2G and the columnar spacer 2B or 2G is adjacent to the columnar spacer 2R. Accordingly, even if the substrates have shifted from each other, the number of picture elements 1 to be affected by the columnar spacers 2 will be balanced not only in the overall display area but also locally. Thus, the color unevenness is hardly perceivable if any.

Figure 2:
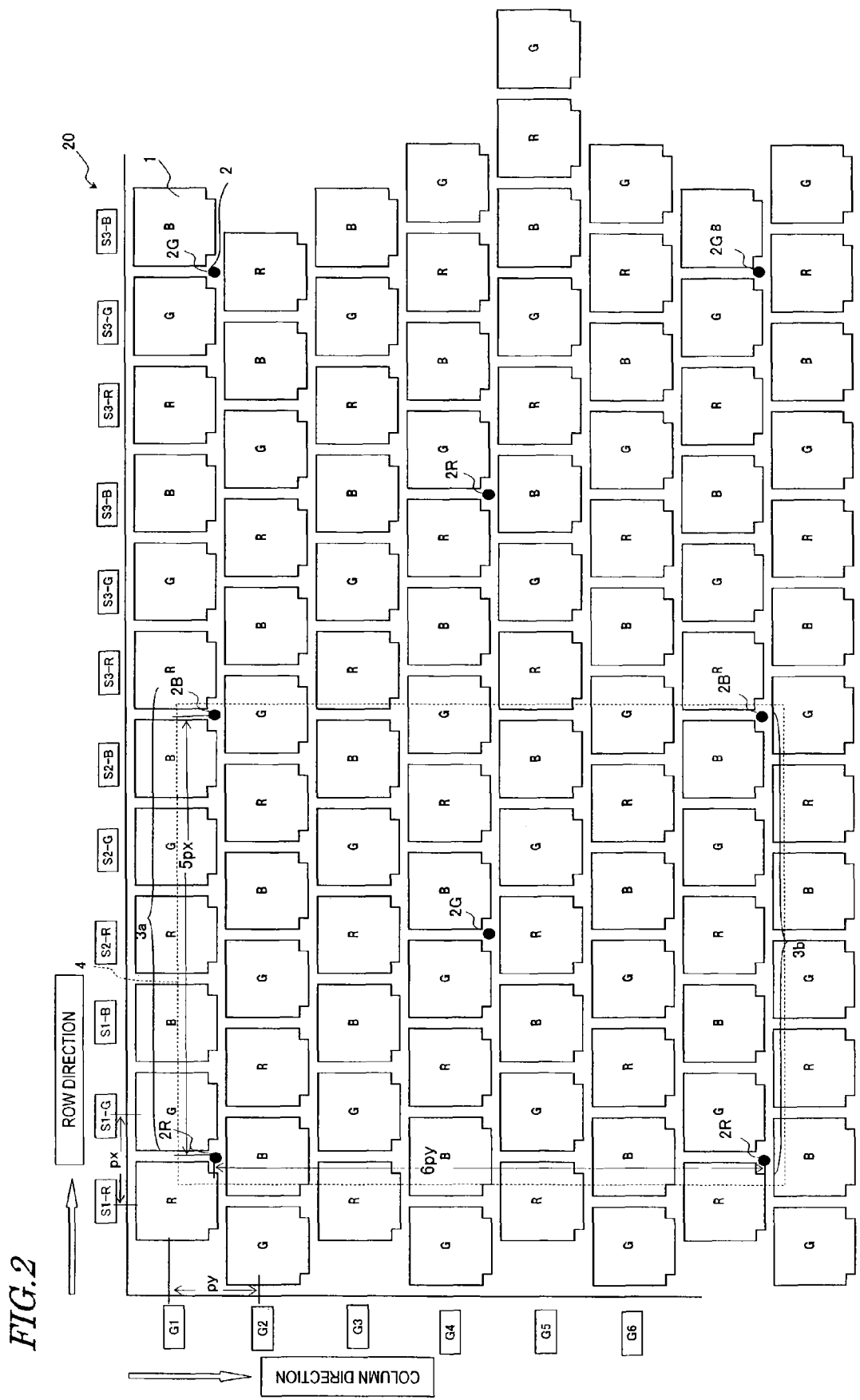
FIG. 2 is a plan view showing an exemplary arrangement of columnar spacers 2 in an LCD 20 according to another preferred embodiment of the present invention.

The LCD 20 shown in FIG. 2 has a higher resolution than the LCD 10 shown in FIG. 1.

In the LCD 10 shown in FIG. 1, the columnar spacers 2 are selectively arranged every second row in the column direction (e.g., on the $1^{st}$ row associated with the first gate line GI and then on the $3^{rd}$ row associated with the third gate line G3, and so on) and every second picture element 1 (i.e., such that each pair of horizontally adjacent columnar spacers 2 sandwiches two picture elements 1 between them) in the row direction. On the other hand, in the LCD 20 shown in FIG. 2, the columnar spacers 2 are selectively arranged every third row in the column direction (e.g., on the $1^{st}$ row associated with the first gate line G1, on the $4^{th}$ row associated with the fourth gate line G4 and then on the $7^{th}$ row associated with the seventh gate line G7, and so on) and every fifth picture element 1 (i.e., such that each pair of horizontally adjacent columnar spacers 2 sandwiches five picture elements 1 between them) in the row direction.

In this manner, the number of picture elements 1 provided between each pair of horizontally or vertically adjacent columnar spacers 2 in the LCD 20 shown in FIG. 2 is different from that of picture elements 1 provided between each pair of horizontally or vertically adjacent columnar spacers 2 in the LCD 10 shown in FIG. 1. However, the columnar spacers 2R, 2B and 2G of the LCD 20 satisfy the same positional relationship as the counterparts of the LCD 10. Thus, the LCD 20 achieves the same effects as the LCD 10.

The positional relationship satisfied by the columnar spacers 2 and picture elements 1 shown in FIGS. 1 and 2 may also be represented as follows.

Specifically, suppose the picture elements 1 are arranged at a predetermined pitch px in the row direction (i.e., the direction in which the gate lines extend) and at another predetermined pitch py in the column direction (i.e., in the direction in which the source lines extend), respectively. In that case, the columnar spacers 2 include a set 4 of five spacers consisting of a first pair 3a of columnar spacers, a second pair 3b of columnar spacers, and a central columnar spacer 2c. The spacers of the first pair 3a are separated from each other by a distance of m·px (where m is an integer equal to or greater than 2 but is not a multiple of 3) in the row direction. The spacers of the second pair 3b are separated from the spacers of the first pair 3a by a distance of n·py (where n is a positive integer and a multiple of 2) in the column direction. The central spacer 2c is separated from the spacers of the first pair 3a by a distance of m·px/2 in the row direction and by a distance of n·py/2 in the column direction, respectively.

In the LCD 10 shown in FIG. 1, the columnar spacers of each of the first and second pairs 3a and 3b, which are included in the spacer set 4, are separated from each other by 2px in the row direction. The first and second pairs 3a and 3b of columnar spacers are separated from each other by 4py in the column direction. And the central columnar spacer 2c is separated from each of the four columnar spacers 2 in the first and second pairs 3a and 3b by px in the row direction and by 2py in the column direction, respectively.

In the LCD 20 shown in FIG. 2, the columnar spacers of each of the first and second pairs 3a and 3b, which are included in the spacer set 4, are separated from each other by 5px in the row direction. The first and second pairs 3a and 3b of columnar spacers are separated from each other by 6py in the column direction. And the central columnar spacer 2c is separated from each of the four columnar spacers 2 in the first and second pairs 3a and 3b by 2.5px in the row direction and by 3py in the column direction, respectively.

That is to say, in the spacer set 4 consisting of the five columnar spacers 2, a rectangle is defined by the two pairs 3a and 3b of columnar spacers and the central columnar spacer 2c is located at the geometric center of the rectangle. The distance between the two columnar spacers 2 of each of the first and second pairs 3a and 3b is a multiple of the pitch px in the row direction but not a multiple of 3 such that each pair of horizontally adjacent columnar spacers 2 are associated with picture elements in two different colors. Also, the color of the picture element associated with the central columnar spacer 2c is different from those of the picture elements associated with the columnar spacers 2 in the first and second pairs 3a and 3b.

By arranging the spacer sets 4, each satisfying the relationships described above, regularly in the column and row directions, the effects achieved by the LCDs 10 and 20 are also achievable.

Figure 3:
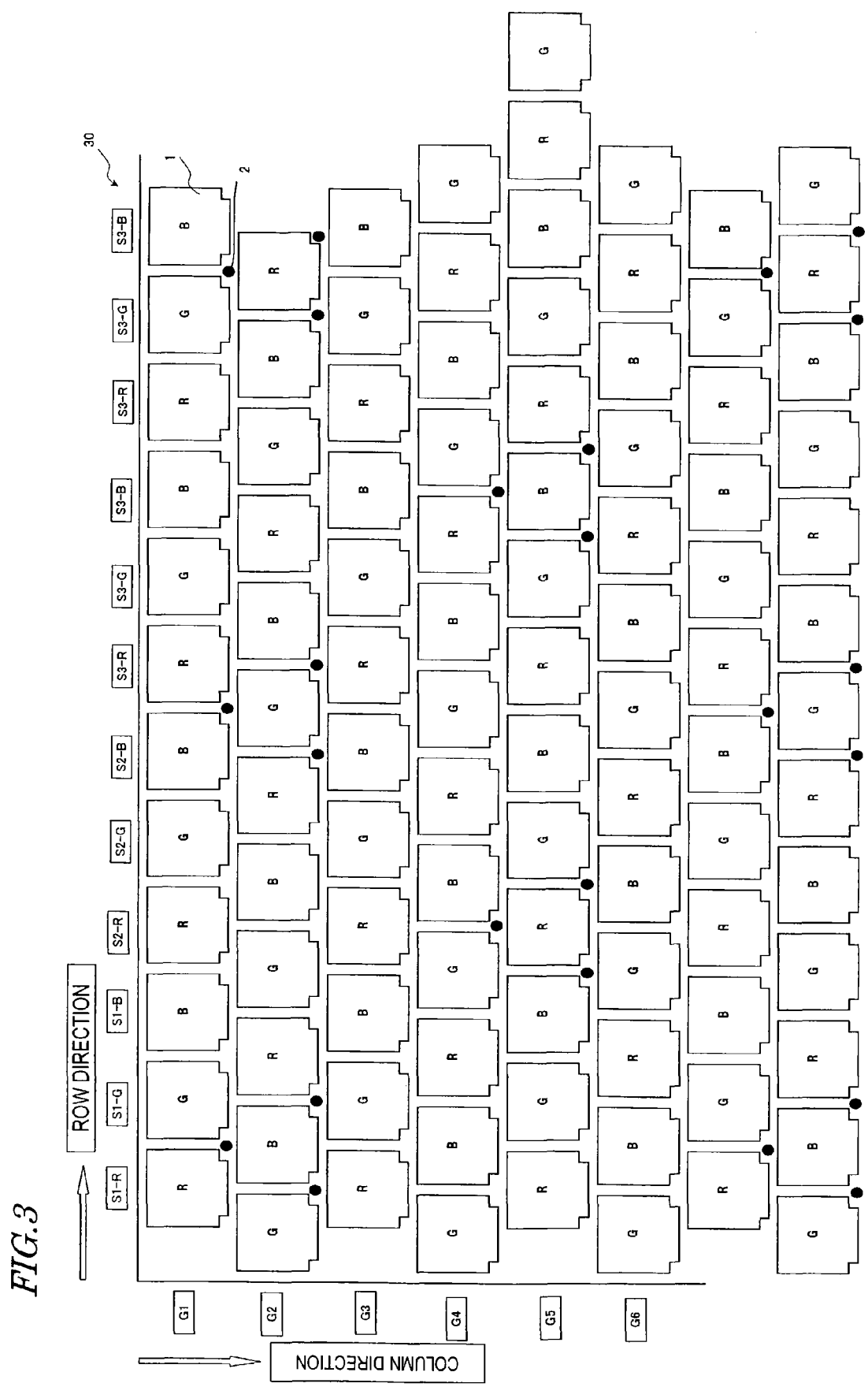
FIG. 3 is a plan view showing an exemplary arrangement of columnar spacers 2 in an LCD 30 according to still another preferred embodiment of the present invention.

Also, based on the positional relationships described above, the columnar spacers 2 may also be arranged as in the LCD 30 shown in FIG. 3.

In the LCD 30, three columnar spacers 2 are provided for a set of three R, G and B picture elements, which make up one pixel, and define a triangle around one of the three picture elements. These three columnar spacers 2 are arranged so as to satisfy the positional relationships described above. That is to say, one of the three vertices of a triangle defined by the three columnar spacers 2 surrounding one picture element and associated vertex of a horizontally or vertically adjacent triangle defined by the three columnar spacers 2 surrounding another picture element satisfy the same positional relationship as the counterparts shown in FIG. 2.

As far as a predetermined cell gap can be maintained, the density of columnar spacers 2 is preferably as low as possible. In view of this consideration, the arrangement shown in FIG. 2 is more preferable to that shown in FIG. 3. However, the arrangement shown in FIG. 3 may also be adopted, either fully or just partially, in a situation where the LCD is easily affected by some external force.

The preferred embodiments of the present invention described above are applied to an LCD including spacers that are arranged in a delta arrangement pattern. Alternatively, the present invention is equally applicable for use in the LCD 40 shown in FIG. 4 or the LCD 50 shown in FIG. 5 in which the spacers are arranged in a striped arrangement pattern.

Figure 4:
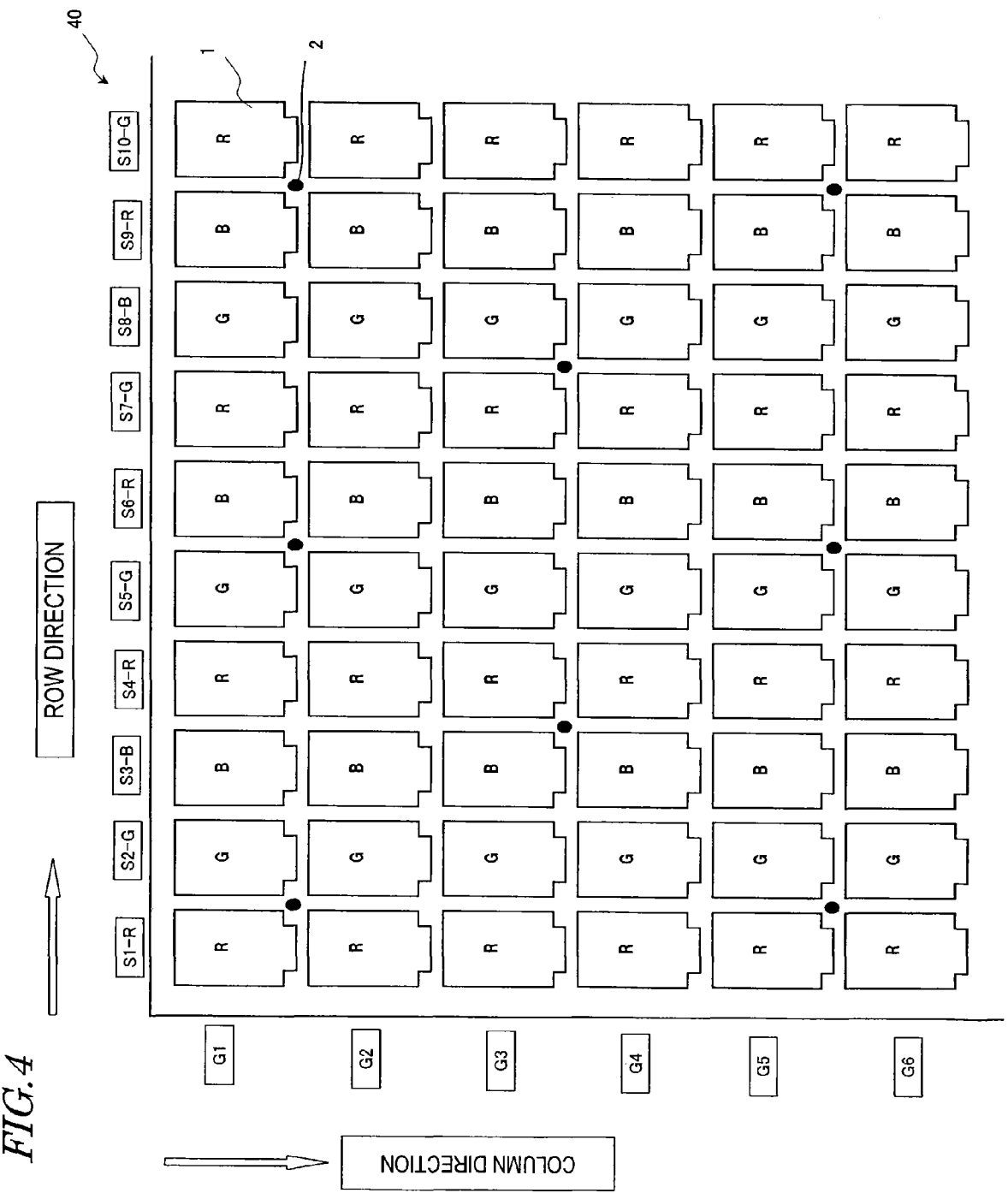
FIG. 4 is a plan view showing an exemplary arrangement of columnar spacers 2 in an LCD 40 according to yet another preferred embodiment of the present invention.
Figure 5:
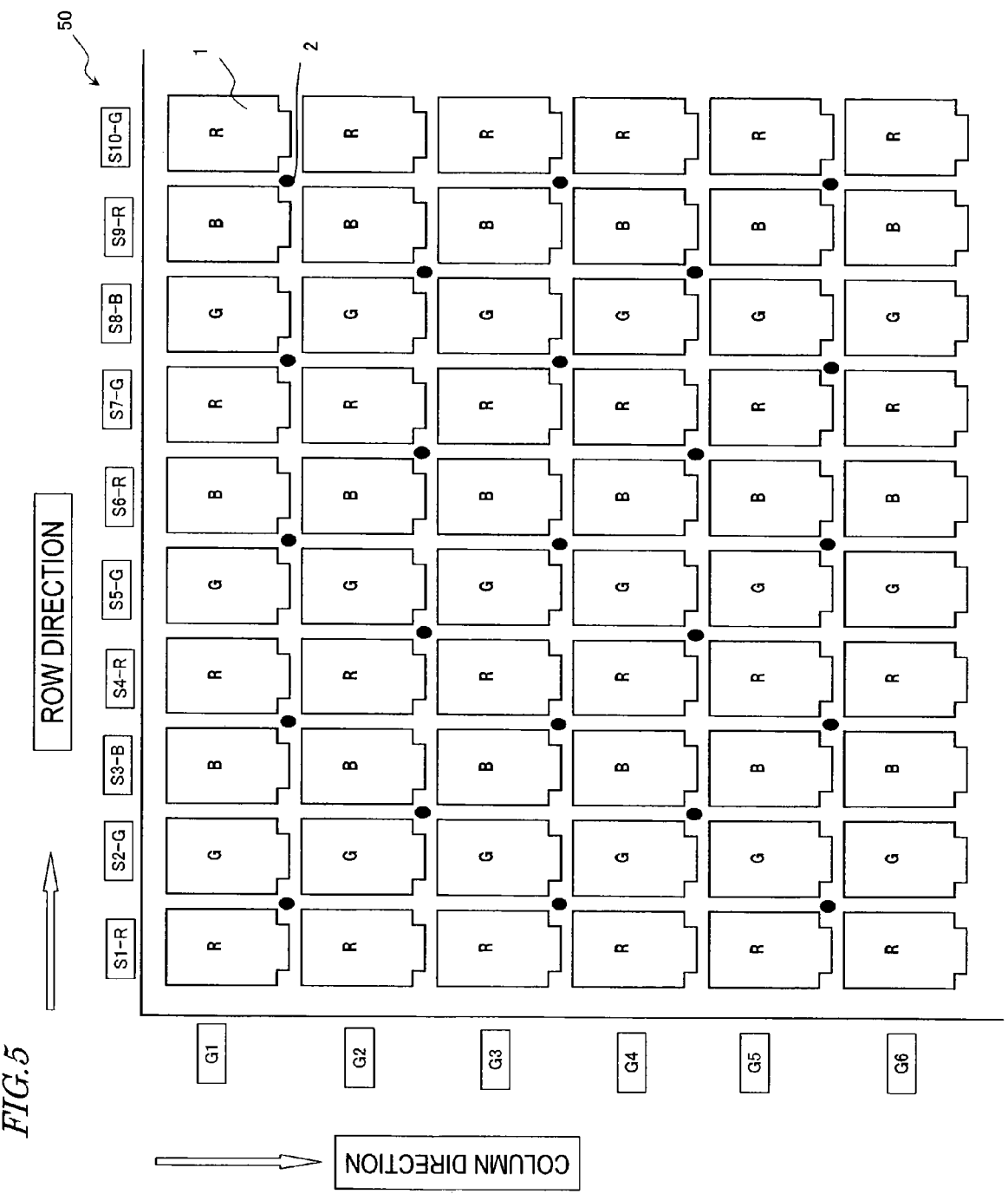
FIG. 5 is a plan view showing an exemplary arrangement of columnar spacers 2 in an LCD 50 according to yet another preferred embodiment of the present invention.

Specifically, in the LCD 40 shown in FIG. 4, m=4 and n=4 to define the distance between horizontally adjacent columnar spacers 2 and the distance between vertically adjacent columnar spacers 2, respectively. On the other hand, in the LCD 50 shown in FIG. 5, m=2 and n=2 to define the distance between horizontally adjacent columnar spacers 2 and the distance between vertically adjacent columnar spacers 2, respectively.

Figure 6:
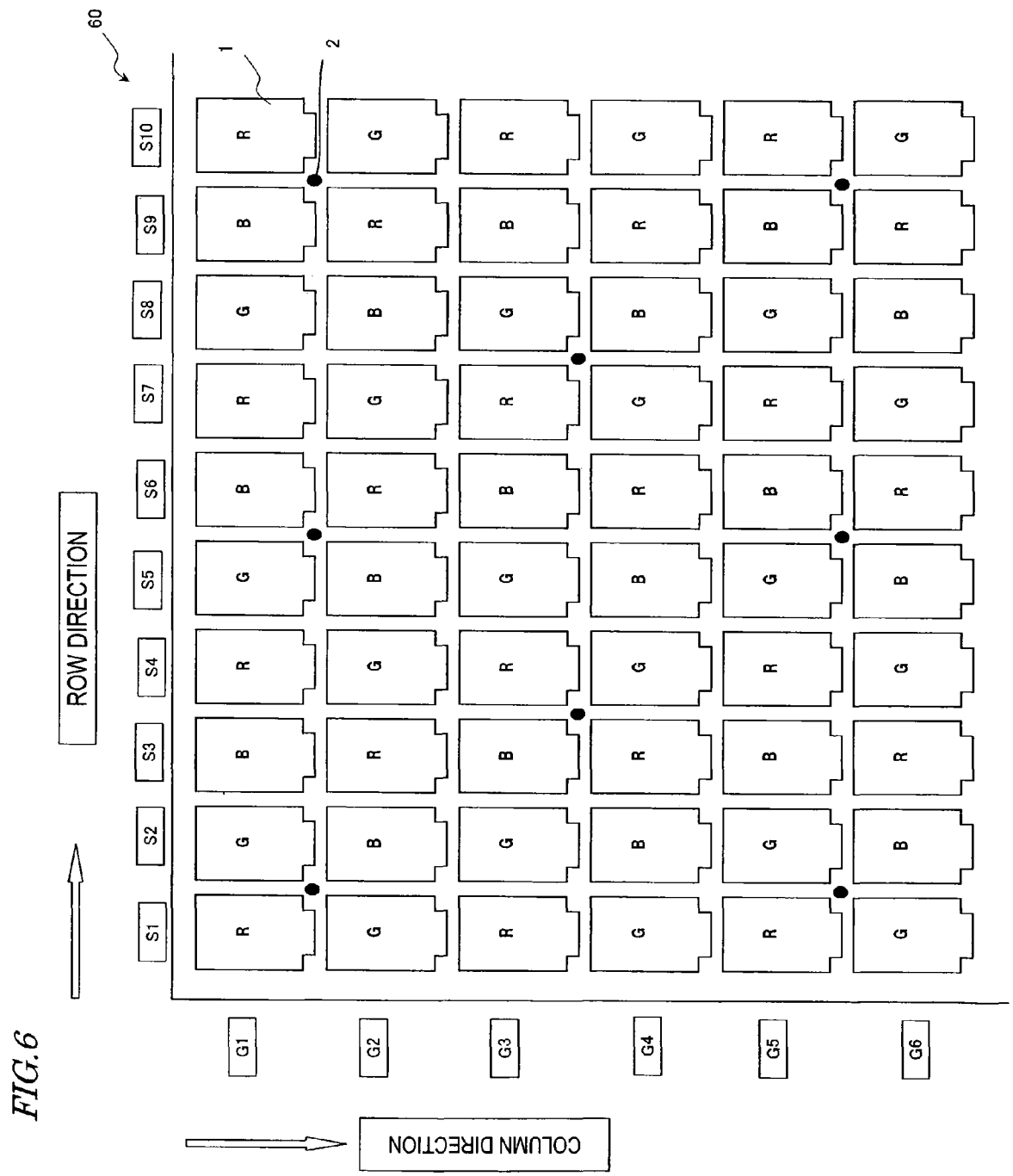
FIG. 6 is a plan view showing an exemplary arrangement of columnar spacers 2 in an LCD 60 according to yet another preferred embodiment of the present invention.

The present invention is further applicable for use in the LCD 60 shown in FIG. 6 in which spacers are arranged in a mosaic arrangement pattern. In the LCD 60 shown in FIG. 6, m=4 and n=4 to define the distance between horizontally adjacent columnar spacers 2 and the distance between vertically adjacent columnar spacers 2, respectively.

According to various preferred embodiments of the present invention described above, the columnar spacers 2 are uniformly arranged for the respective picture elements in the three different colors. Thus, even if the substrates have shifted from each other, the display quality of picture elements in a particular color does not deteriorate. The columnar spacer arrangement according to a preferred embodiment of the present invention is preferably applied to the overall display area but may also be applied just locally depending on the necessity.

Also, the columnar spacers 2 may be provided for either the color filter substrate or the TFT substrate. If the columnar spacers 2 are provided on the color filter substrate, then the picture elements 1 of the preferred embodiments described above correspond to the color filters.

Various preferred embodiments of the present invention have been described as being applied to a TFT LCD. However, the present invention is also applicable for use in any other type of LCD. Furthermore, the present invention is applicable for use in not just LCDs but also various other types of display devices (e.g., electrophoretic display device) including columnar spacers.

Various preferred embodiments of the present invention described above provide a display device, which can present an image at a high resolution and with an excellent color balance maintained, and a color filter substrate, which can be used effectively in such a display device.

The present invention is applicable particularly effectively to a small-sized, high-definition display device (e.g., a display device with a pixel density comparable to that of a 13-inch VGA) and can improve its display quality significantly.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A color filter substrate comprising:
   a base member;
   a color filter layer, which is provided on the base member and which is made up of a first group of color filters, a second group of color filters and a third group of color filters, the first, second and third groups of color filters transmitting light rays representing three different colors, respectively;

a plurality of spacers, which are provided at predetermined relative positions for selected ones of the color filters, the selected color filters consisting of a number of color filters belonging to the first group of a first color, a number of color filters belonging to the second group of a second different color, and a number of color filters belonging to the third group of a third different color, so that some but not all of the color filters of each of the first color, second color, and third color are provided with spacers, the spacers being arranged such that in the selected color filters, the smallest number of color filters of the first, second or third group is at least 80% of the largest number of color filters of the first, second or third grouping; and wherein the color filters are arranged at a predetermined pitch px in a row direction and at another predetermined pitch py in a column direction, respectively, and wherein the spacers include a spacer set consisting of five spacers with no other spacers therebetween, wherein the spacer set of five spacers consists of a first pair of spacers, a second pair of spacers, and a central spacer, the spacers of the first pair being separated from each other by a distance of m·px (where m is an integer equal to or greater than 2 but is not a multiple of 3) in the row direction, the spacers of the second pair being separated from the spacers of the first pair by a distance of n·py (where n is a positive integer and a multiple of 2) in the column direction, the central spacer being separated from the spacers of the first pair by a distance of m·px/2 in the row direction and by a distance of n·py/2 in the column direction, respectively.

2. The color filter substrate of claim 1, wherein the color filter substrate is used in a display device, and wherein when attached to the display device, the spacers are arranged in at least 80% of a display area of the display device.

3. The color filter substrate of claim 1, wherein the spacers are provided in gaps between the color filters.

4. The color filter substrate of claim 1, wherein the spacers are columnar spacers.

5. The color filter substrate of claim 1, wherein the first pair of spacers and the central spacer consist of a first spacer, a second spacer and a third spacer associated with the first, the second and the third groups of color filters, respectively, the second pair of spacers and the central spacer consist of another first spacer, another second spacer and another third spacer associated with the first, the second and the third groups of color filters, respectively.

6. The color filter substrate of claim 5, wherein the spacers of the first pair are adjacent to each other in the row direction, the spacers of the second pair are also adjacent to each other in the row direction, and the spacers of the first and second pairs include spacers that are adjacent to each other in the column direction.

7. The color filter substrate of claim 1, wherein the color filters include multiple sets of color filters, each said set of color filters consisting of three color filters belonging to the first, second and third groups, respectively, and wherein the selected color filters, for which the spacers are provided, belong to mutually different sets of color filters.

8. The color filter substrate of claim 7, wherein the different sets of color filters, to which the color filters provided with the spacers belong, are not adjacent to each other.

9. The color filter substrate of claim 1, wherein the spacers are arranged at a density of 800 spacers/cm$^2$ to 1,200 spacers/cm$^2$ respect to the color filter layer.

* * * * *